(12) United States Patent
Deeley

(10) Patent No.: US 8,696,313 B2
(45) Date of Patent: Apr. 15, 2014

(54) OPPOSED TILTING BLADE, VERTICAL AXIS WIND TURBINE POWER GENERATOR

(76) Inventor: Peter G. R. Deeley, San Bernardino, CA (US)

( * ) Notice: Subject to any disclaimer, the term of this patent is extended or adjusted under 35 U.S.C. 154(b) by 619 days.

(21) Appl. No.: 12/974,568

(22) Filed: Dec. 21, 2010

(65) Prior Publication Data

US 2011/0091322 A1 Apr. 21, 2011

Related U.S. Application Data

(63) Continuation-in-part of application No. 12/687,682, filed on Jan. 14, 2010, now Pat. No. 8,382,435.

(60) Provisional application No. 61/207,789, filed on Feb. 18, 2009.

(51) Int. Cl.
*F03D 3/02* (2006.01)

(52) U.S. Cl.
USPC .......................................... 416/110; 416/117

(58) Field of Classification Search
USPC ........... 415/4.2, 4.4; 416/17, 41, 117, DIG. 4, 416/110
See application file for complete search history.

(56) References Cited

U.S. PATENT DOCUMENTS

| | | |
|---|---|---|
| 175,032 A | 3/1876 | Cleaver |
| 185,924 A | 1/1877 | Howland et al. |
| 504,301 A | 8/1893 | Davis et al. |
| 584,986 A | 6/1897 | Chapman |
| 631,982 A | 8/1899 | Bruce |
| 1,352,952 A | 9/1920 | Gracey |
| 1,581,537 A | 4/1926 | Heeigh |
| 1,915,689 A | 6/1933 | Moore |
| 2,170,911 A | 8/1939 | Raulerson |
| 3,810,712 A | 5/1974 | Hillman |
| 4,097,190 A * | 6/1978 | White ........................... 416/117 |
| 4,161,370 A * | 7/1979 | Oppolzer ....................... 416/17 |
| 4,818,180 A | 4/1989 | Liu |
| 5,083,902 A * | 1/1992 | Rhodes .................... 416/132 B |
| 5,195,871 A * | 3/1993 | Hsech-Pen ..................... 416/12 |
| 5,844,323 A * | 12/1998 | Hung .............................. 290/54 |

(Continued)

FOREIGN PATENT DOCUMENTS

WO WO 2009/003285 * 1/2009

OTHER PUBLICATIONS

Olivier, Wind Turbine with Vertical Axis with Blades Fitted with a Return Means, Jan. 8, 2009, machine translation of WO 2009/003285.*

*Primary Examiner* — Edward Look
*Assistant Examiner* — Liam McDowell
(74) *Attorney, Agent, or Firm* — Kirk A. Buhler; Buhler & Associates

(57) ABSTRACT

Improvements in A wind generator, that may also be called and relates to, windmill, turbine or aero generator, on a vertical axis. The vertical axis gives the windmill the ability to be turned by air, or liquid if inverted, from any direction parallel to the earth's surface. Multiple blades rotate through a horizontal axis into the wind to lessen air resistance on one side while turning vertically on the other side to gain energy from the wind. The system is counter-weighted as needed, to reduce energy loss, by different methods including but not limited to gears, levers, pneumatics, cables, hydraulics or added counter-weight. The electrical generating machinery is below the blades or at the bottom of the vertical drive shaft.

12 Claims, 15 Drawing Sheets

(56) References Cited

U.S. PATENT DOCUMENTS

| | | | |
|---|---|---|---|
| 7,118,341 B2* | 10/2006 | Hartman | 416/17 |
| 7,284,949 B2* | 10/2007 | Haworth | 415/4.2 |
| 7,931,440 B2* | 4/2011 | Bobowick | 416/132 B |
| 8,206,106 B2* | 6/2012 | Syrovy | 416/83 |
| 2005/0082838 A1* | 4/2005 | Collins | 290/55 |
| 2008/0075594 A1* | 3/2008 | Bailey et al. | 416/104 |
| 2010/0140949 A1* | 6/2010 | Pitre et al. | 290/55 |

* cited by examiner

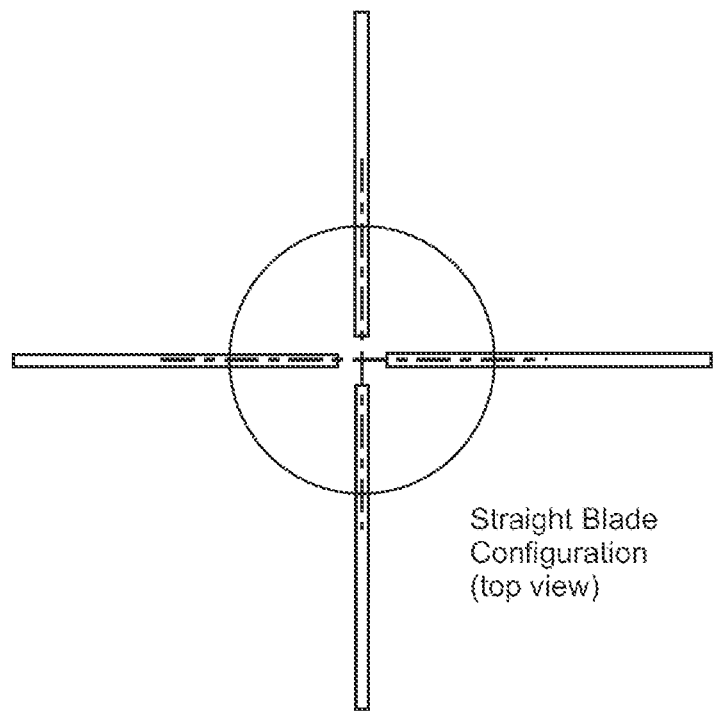
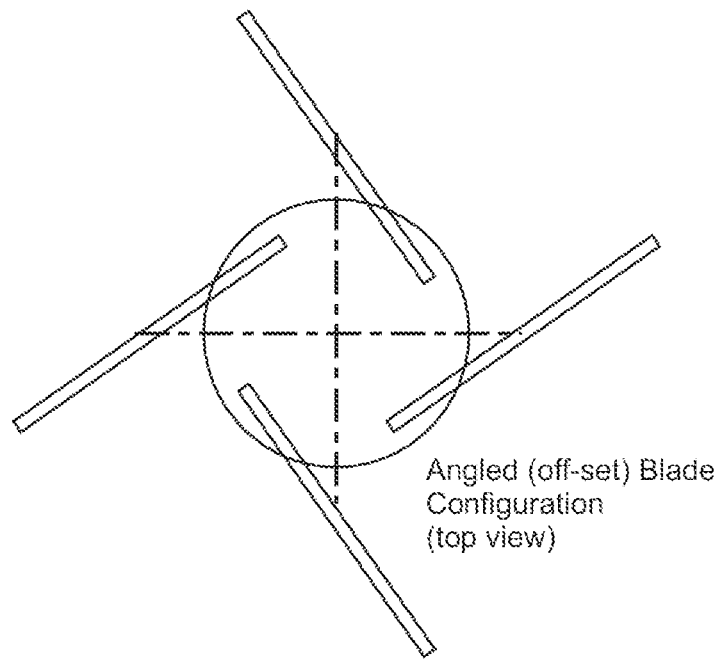
FIG. 9

OPPOSED TILTING BLADE, VERTICAL AXIS WIND TURBINE POWER GENERATOR

CROSS REFERENCE TO RELATED APPLICATION

This application claims the benefit of Provisional 61/207,789 filed Feb. 18, 2009 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in a windmill. More particularly, the present windmill uses opposed tilting blades mounted on a vertical axis to generate power.

2. Description of Related Art including information disclosed under 37 CFR 1.97 and 1.98

This windmill harnesses the power of the wind and turns it into electricity via a generator. Many such windmills have been produced but the vertical axis wind turbines generally lack the efficiency of a traditional horizontal axis wind turbine. However, there is a need for vertically axis turbines as they do not need to be aimed into the wind, are more efficient in the use of land-space and should also prove to be safer because the bulk of the weight of the entire apparatus is near the ground. This windmill provides a more efficient method for harnessing wind power and although it uses more moving parts than previously designed vertical axis wind turbines, its efficiency and simplicity of design will make it worthwhile.

Several products and patents have been issued for vertical windmills where the blade tips to increase or decrease wind drag depending upon rotational position of the blade. Exemplary examples of patents covering these products are disclosed herein.

U.S. Pat. No. 1,581,537 issued Apr. 20, 1926 to H. K. Hennigh, U.S. Pat. No. 1,352,952 issued Sep. 14, 1920 to J. G. Gracey and U.S. Pat. No. 584,986 issued on Jun. 22, 1897 to J, A. Chapman all disclose a vertical windmill where a counterweight arm maintains to blade in a vertical orientation when the blade is being pushed by the wind and allows the blade to tip open when the blade is returning. While these patents disclose a vertical windmill with tipping blades the blades form a single unit and are not opposing.

U.S. Pat. No. 1,915,689 issued Aug. 27, 1933 to I. T. Moore discloses a windmill with opposing blades mounted to a circular track. The circular track provides support to the ends of the blades and further blocks wind flow into the blades. While this patent discloses tipping blades the blades are supported in an outer ring where a mechanical linkage links the blades together.

U.S. Pat. No. 504,301 issued to E. L. Davis & J. N White on Aug. 29, 1893 and U.S. Pat. No. 185,924 issued Jan. 2, 1977 to E. Howland & J. B. Sweetland both disclose windmills where the blades on opposite ends of the windmill are set 90 degrees opposed. In operation, linking the opposing blades will result in the both blades operating in a partially opened and closed condition where efficiency of the blades is significantly reduced.

What is needed is a vertical shaft windmill where each vane of the windmill is independent and can articulate to provide optimal efficiency. The proposed application provides this solution.

BRIEF SUMMARY OF THE INVENTION

It is an object of the opposed tilting blade turbine for the vertical axis, wind driven turbine uses blades that rotate on the horizontal axis. The vertical axis eliminates the need for the array of blades to be turned to face an oncoming wind. This significantly reduces the mechanical complexity when the direction of the wind is not constant.

It is an object of the opposed tilting blade turbine for the vertical axis, wind driven turbine for each pair of blades to be attached to a shaft, where they rotate on bearings on the housing/drive shaft and are aligned in such a way that as one of the blades collects the power of the wind the other feathers downwind thereby reducing air resistance. This provides and optimal attack angle for the blades to reduce mechanical inefficiencies.

It is still another object of the opposed tilting blade turbine for the vertical axis, wind driven turbine for each blade to assist the other in gaining the correct position and uses the same wind power to do this. Each of the systems shown also has a balanced weight system to reduce loss of power.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 1 a perspective of the opposed rotating blade, vertical axis wind turbine power generator.

FIG. 9 shows a top view how angled blades in the lower diagram may be arranged compared to a straight blade configuration.

DETAILED DESCRIPTION OF THE INVENTION

Drawings

Reference Numerals

| | |
|---|---|
| 26a, 26b, 26c, 26d-26p | gears |
| 27b, 27c, & 27d | levers |
| 28a, 28b | Rotational stabilizer |
| 29a, 29b, 29c, & 29d | counterweights |
| 30a, 30b, 30c & 30d | override motion stops |
| 31a, 31b, 31c & 31d | stop levers |
| 32 | drive shaft |
| 33 | housing |
| 34a, 34b, 34c, 34d, 34e & 34f-34i | blade shafts |
| 35a, 35b, 35c, 35d, 35e, 35f, 35g & 35h | blades |
| 36a, 36c, 36e, 36g & 36h | bearings |
| 37a, 37b | "S" belts |
| 38a, 38b | bearing housings |
| 46a, 46b, 46c, 46e, 46f, 46g, & 46i | roller or pulley |
| 47a, 47b, to 47o. | belt, chain, cable or link |
| 48a to 48k. | transfer bar |
| 49 | plate |
| 52a-52d | crank arm or lever arm |
| 53a | rod |
| 54a-54h | Bezel, crown or 45° gear |
| 55a-55b. | Drive shaft |

Figure 1:
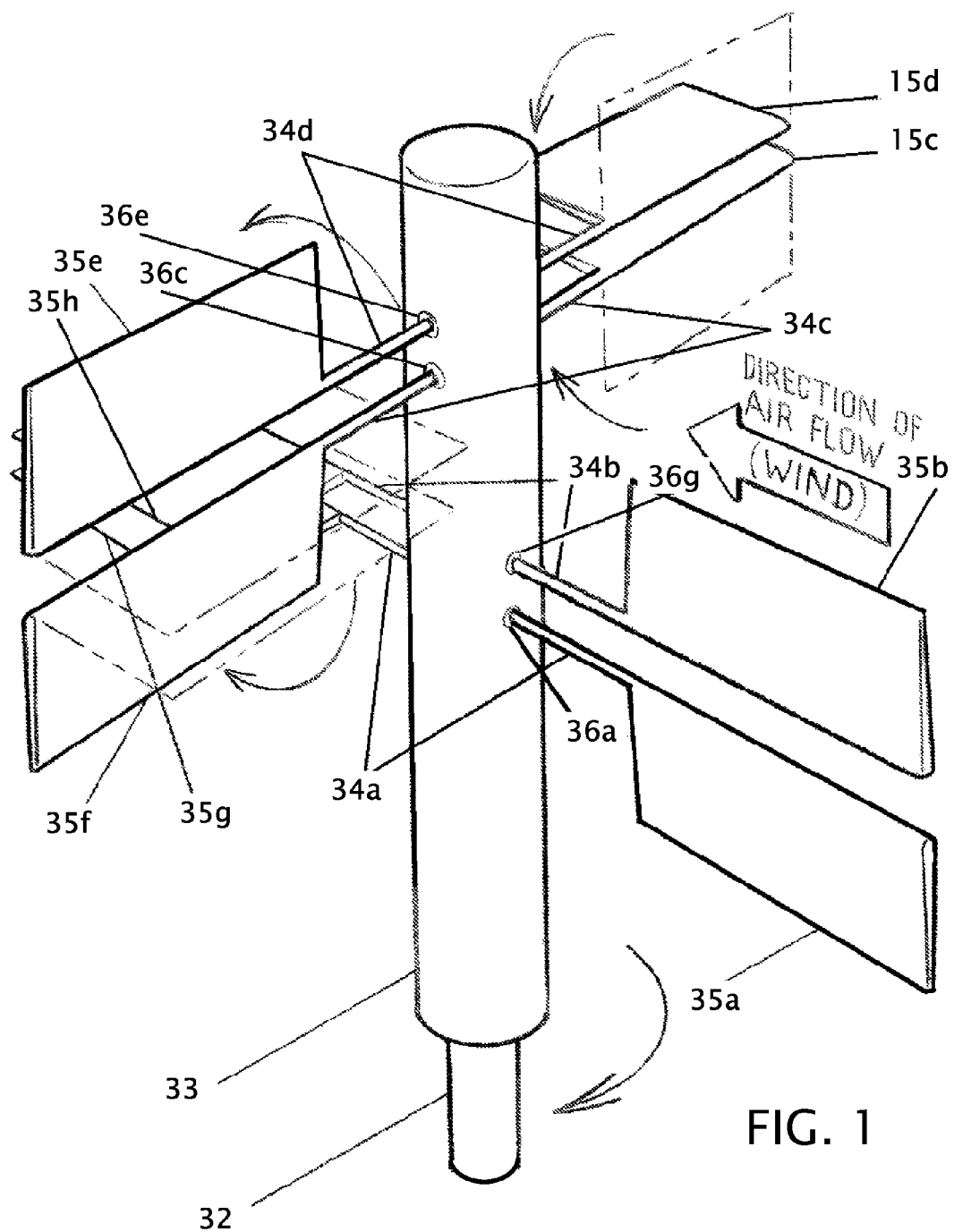

FIG. 1 shows a perspective of the opposed rotating blade, vertical axis wind turbine power generator, in accordance with the windmill and its blades assemblies including the blade shafts 34*a*, 34*b*, 34*c*, 34*d*, and the blades 35*a*, 35*b*, 35*c*, 35*d*, 35*e*, 35*f*, 35*g*, mounted to the housing 33. Each of the blades 35*a*, 35*b*, 35*c*, 35*d*, 35*e*, 35*f*, and 35*g* is wind foil shaped to minimize wind drag when the blades move against the wind. The housing 33 is secured to a vertical drive shaft 32 that is attached at the lower section to a generator through gears or transmission. The gears, transmission and generator are not shown. Each of the shafts 34*a*, 34*b* are oriented one above the other but can also be mounted side-by-side, and a transmission causes the shafts to counter rotate the blades 35*a*, 35*b*, and blades 35*g*, 35*h*, ninety degrees (90°). Shafts 34*c*, 34*d* are shown mounted one above the other but can also be mounted side-by-side, and counter rotate ninety degrees (90°) by means of a transmission. The pair of shafts 34*a*, 34*b* is horizontally mounted above and below each other and are oriented ninety degrees (90°) to the other previously mentioned shafts 34*c*, 34*d*. Each pair of shafts 34*a*, 34*b* and pair 34*c*, 34*d* operates independently of each other. Each shaft has two blades where each blade is mounted on each end of each shaft.

Figure 2:
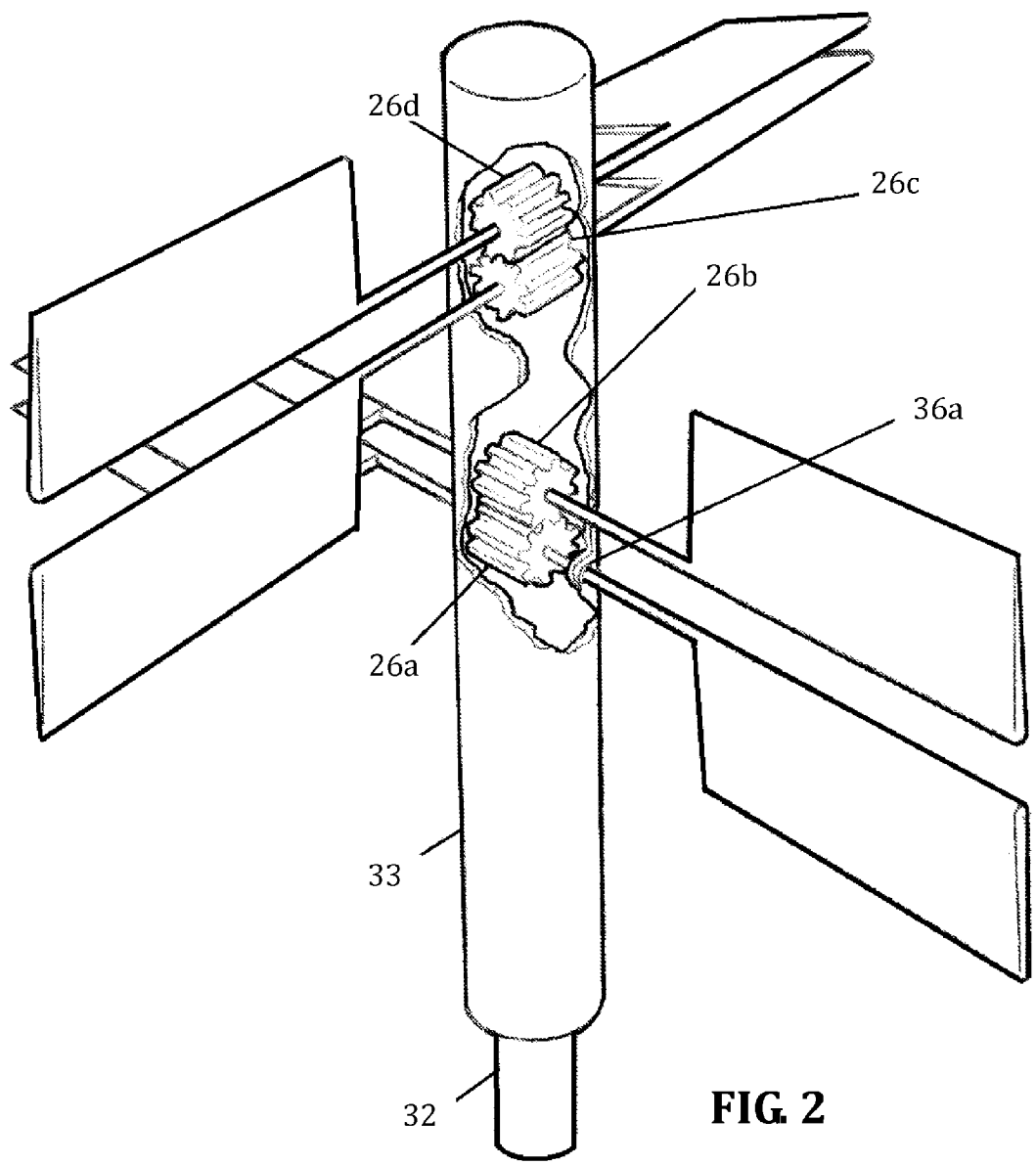
FIG. 2 is a cut-away view of the same blades assemblies displaying one method of driving the shafts pairs.

FIG. 2 shows a cut-away view of the same blades assemblies displaying one method of driving the shafts pairs 34*a*, 34*b*, and shaft pairs 34*c*, 34*d*, by a set of two interlocking gears 26*a*, 26*b*, 26*b* and 26*d* fixed to the housing and drive shaft assembly by bearings 36*a*, 36*b*, 36*e*, 36*c*, 36*d*, 36*f*, 36*g* 36*h*, are not visible) so they turn ninety degrees (90°) on the horizontal axis. Each blade shaft has two blades configured ninety degrees (90°) to each other on each side of the housing and drive shaft assembly.

Figure 3:
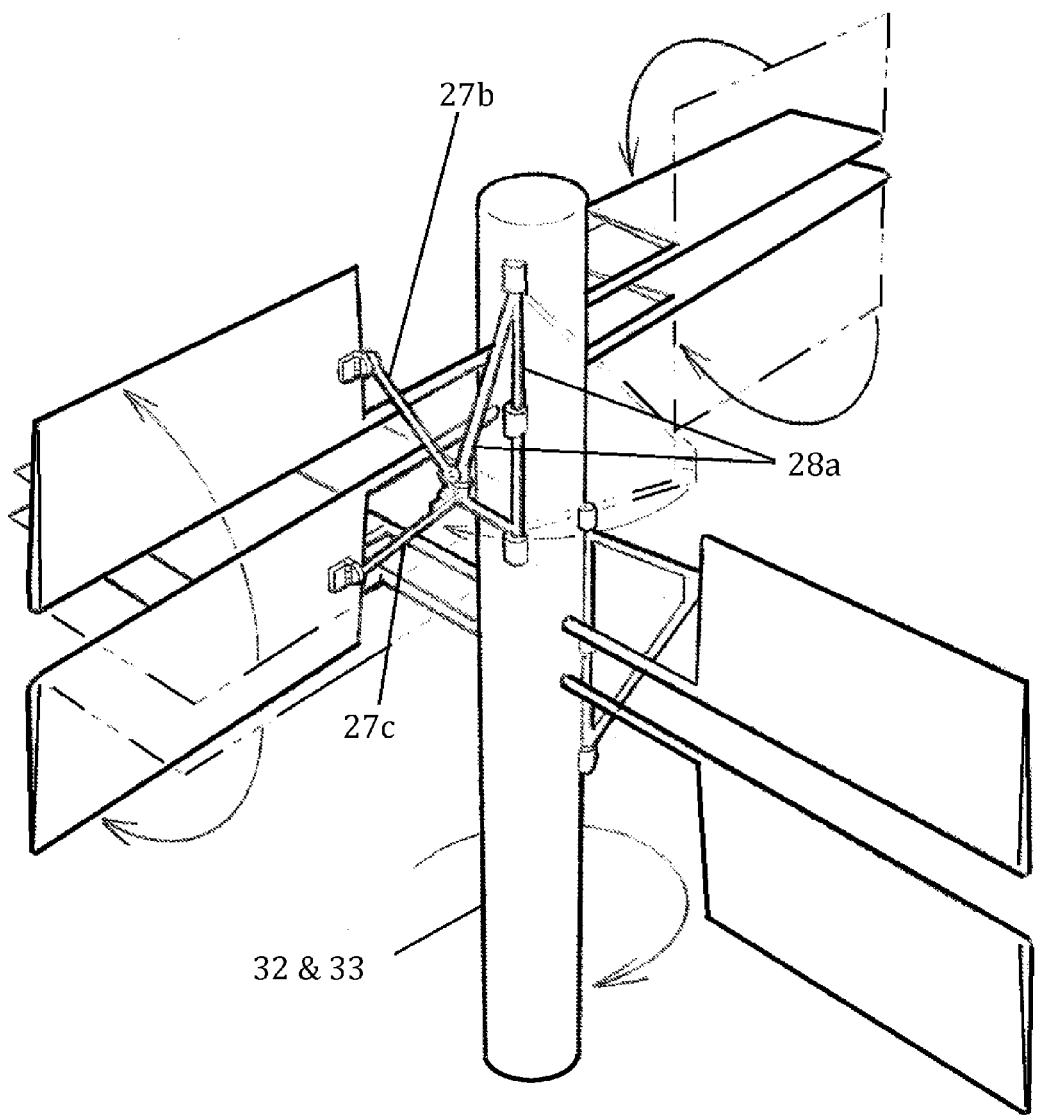
FIG. 3 show an alternative way to achieve counter rotation in the pair of blade shafts.

FIG. 3 show a second preferred embodiment that shows a way to achieve counter rotation in the pair of blade shafts 34*a*, 34*b* and blade shafts 34*c*, 34*d* the counter rotation is by means of levers. Lever 27*b* has a two-hinge assembly or a universal joint at both the blade end and the rotation stabilizer end 28*a*. The rotational stabilizer 8*a* maintains horizontal movement for one end of the levers 27*b* and 27*c*. This arrangement is repeated on each set of blades to maintain equal weight and mechanical stability.

Figure 4:
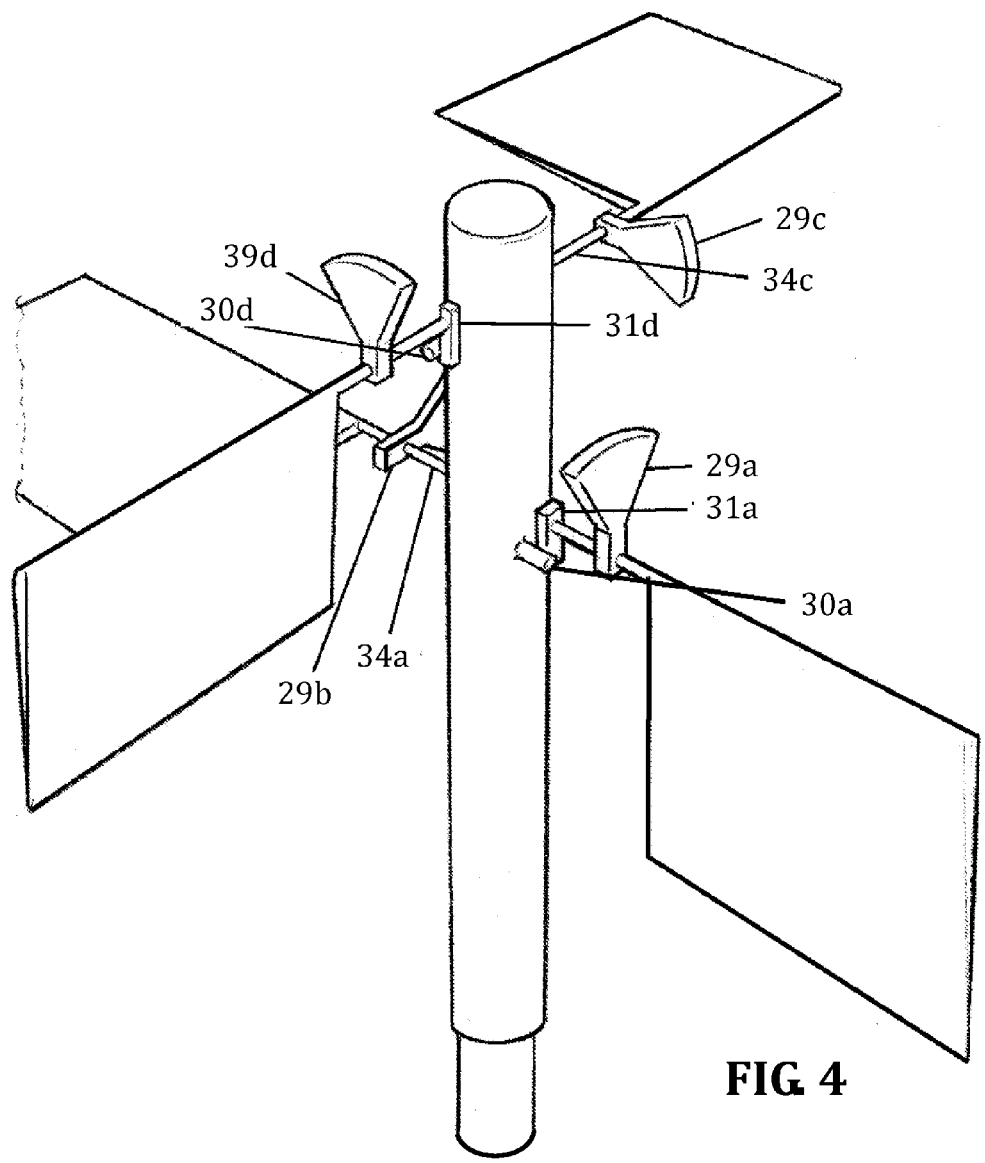
FIG. 4 shows a method for achieving the intention of the windmill using half the number of blades.

FIG. 4 shows a third preferred embodiment that achieves the intention of the windmill using half the number of blades. Counter weights 29*a*, 29*d*, 29*b*, 29*c* are added to the opposite side of the blades to eliminate any undesirable weight factor. Motion stops 30*a* 30*d*, (30*b* and 30*c* are not visible) secured to the housing/drive-shaft to prevent over-travel of the blade beyond ninety degrees (90°). The stop levers 31*a*, 31*d* (31*b* and 31*c* are not visible) but are fixed to the blade shafts 34*a*, 34*c* in two places.

Figure 5:
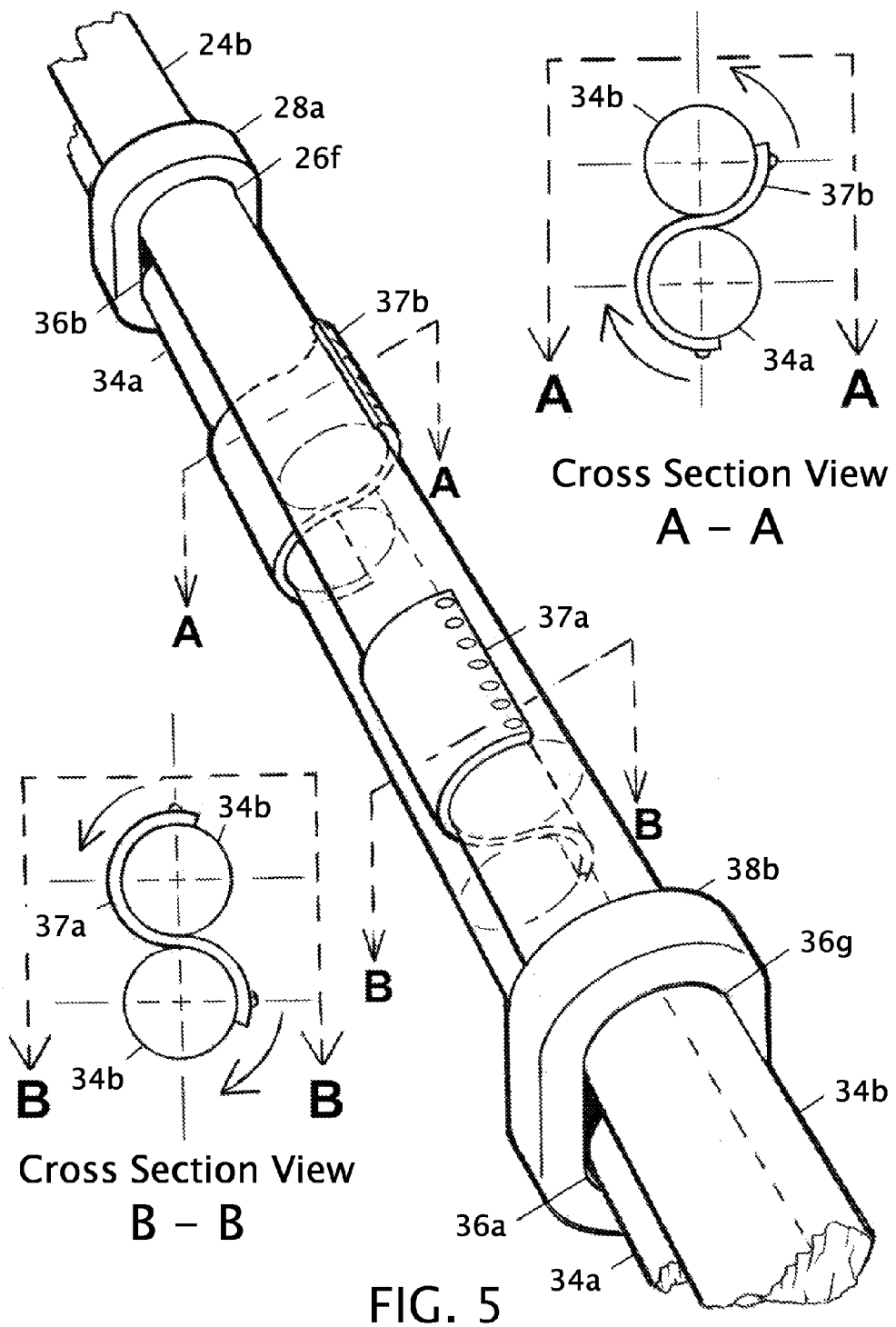
FIG. 5 shows an alternative way to counter-balance and rotate the blades ninety degrees (90°) to affect their operation.

FIG. 5 shows an alternative way to counter-balance and rotate the blades ninety degrees (90°) to affect their operation. Only the center portion of the blade shafts 34*a*, 34*b* are shown with the housing removed. Two bearing housings, 38*a* and 38*b*, house two bearings each 36*b* and 36*f*, in bearing housing 38*a*, bearings, 36*a* and 36*g*, in housing 38*b* they allow the two shafts (34*a* and 34*b*) to remain aligned and in position and turn through ninety degrees (90°). "S" belt 37*b* is attached at the end edge to blade shaft 34*b* at the ninety degree (90°) position; passes between shafts 34*a*, 34*b* and is fixed at the end edge to blade shaft 34*a* at the one hundred and eighty degree (180°) point. "S" belt 37*a* is attached at the end edge to blade shaft 34*b* at the zero (360°) position, passes between shafts 34*a*, 34*b* and is fixed at the end edge to blade shaft 34*a* at the ninety degree (90°) point. The tension in "S" belts 37*a* and 37*b* provide traction to drive the blade shafts 34*a*, 34*b* in opposite directions. Two belts are shown to simplify depiction, but three of more would be preferred to balance the system and allow the system to be inverted. This configuration could also be applied using link chains (bicycle type) or link belts.

Figure 6:
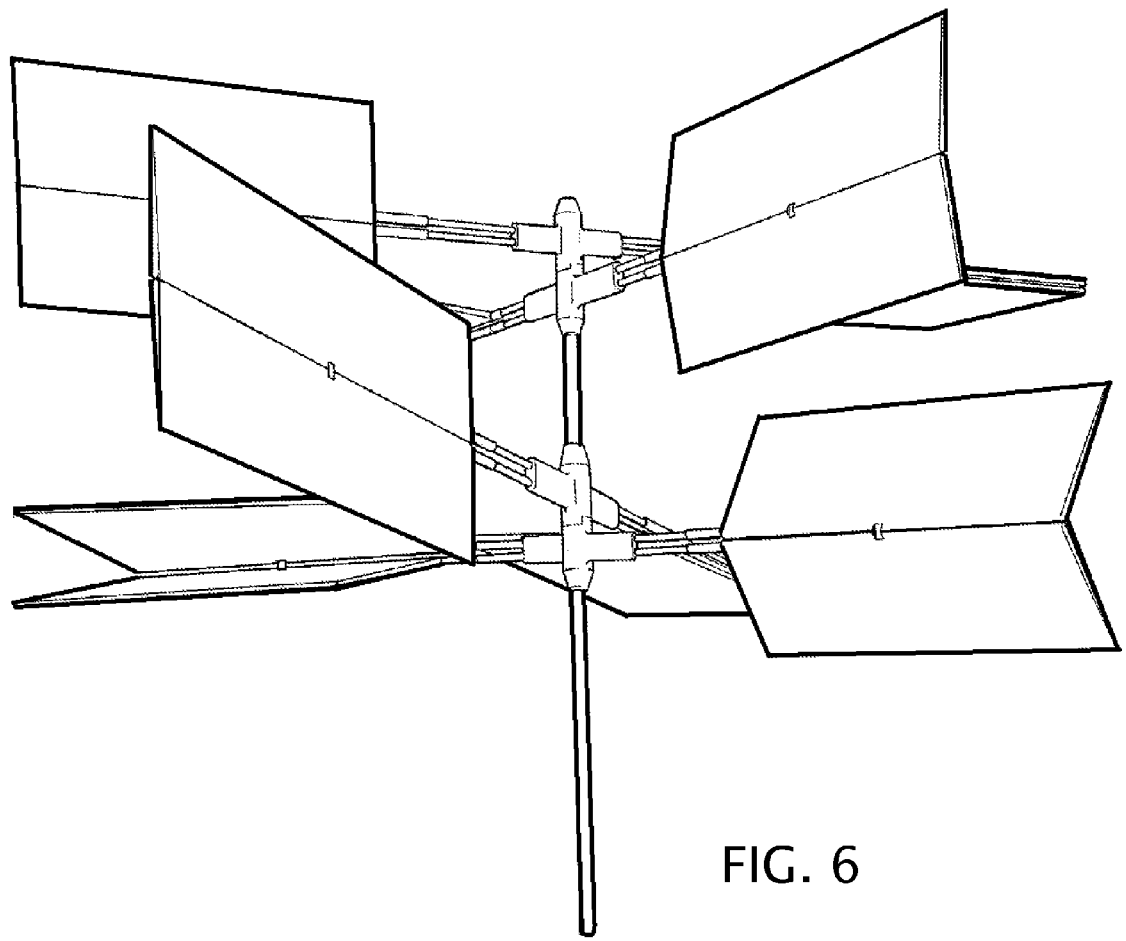
FIG. 6 shows a multiple blade configuration using eight (8) pairs of blades.

FIG. 6 shows a multiple blade configuration using eight (8) pairs of blades.

Figure 7:
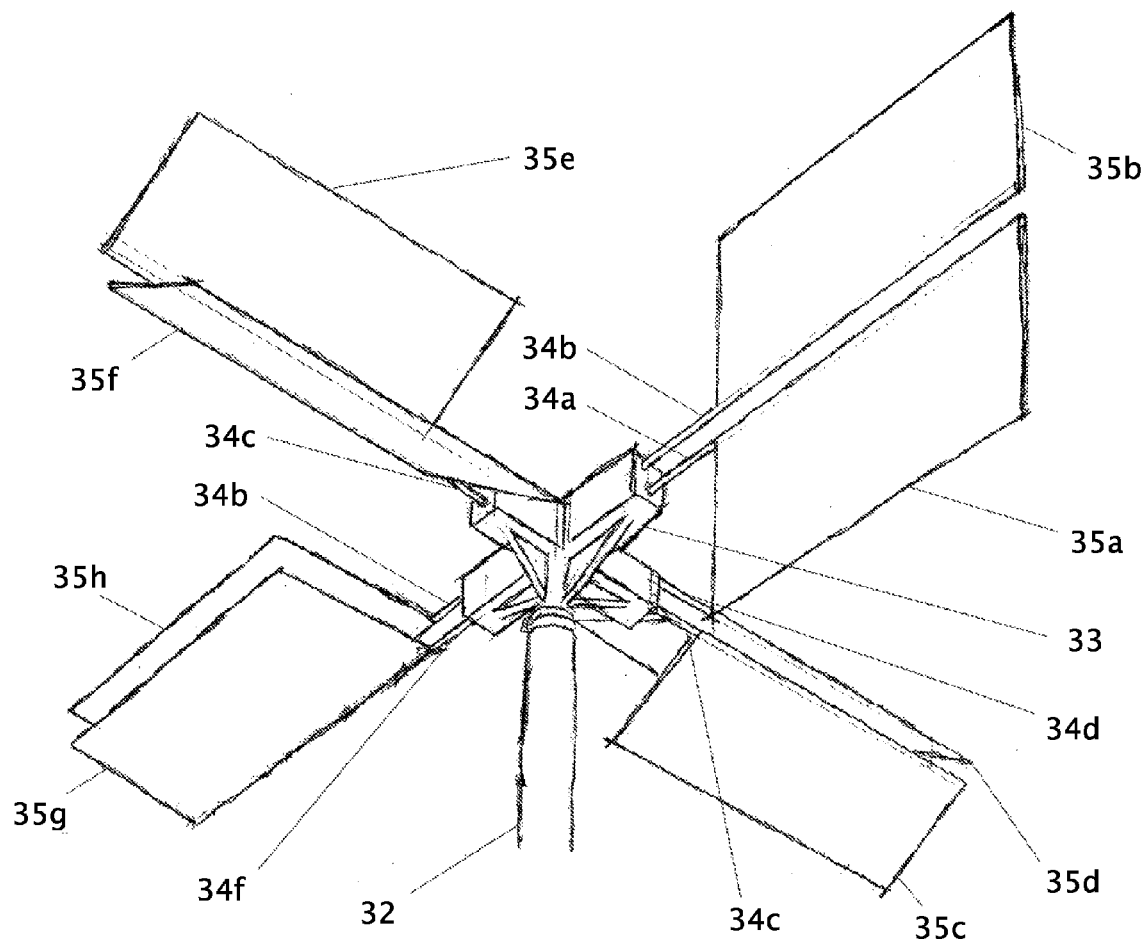
FIG. 7 shows a perspective of opposed rotating blade, vertical axis wind turbine power generator.

FIG. 7 shows a perspective of opposed rotating blade, vertical axis wind turbine power generator in accordance with the windmill and its blade assemblies, in an aligned configuration, including the shafts 34*a*, 34*b*, 34*c*, 34*d*, and the blades 35*a*, 35*b*, 35*c*, 35*d*, 35*e*, 35*f*, 35*g* 35*h*, mounted to the housing 33. Each of the blades 35*a*, 35*b*, 35*c*, 35*d*, 35*e*, 35*f*, 35*g* and 35*h* is wind foil shaped to minimize wind drag when the blades move against the wind. Differing from the previous design, the blades shafts 34*a*, 34*b* and 34*f* are brought into alignment with on the same plane as 34*c*, 34*d* and 34*e*, producing a more attractive and compact design.

Figure 8:
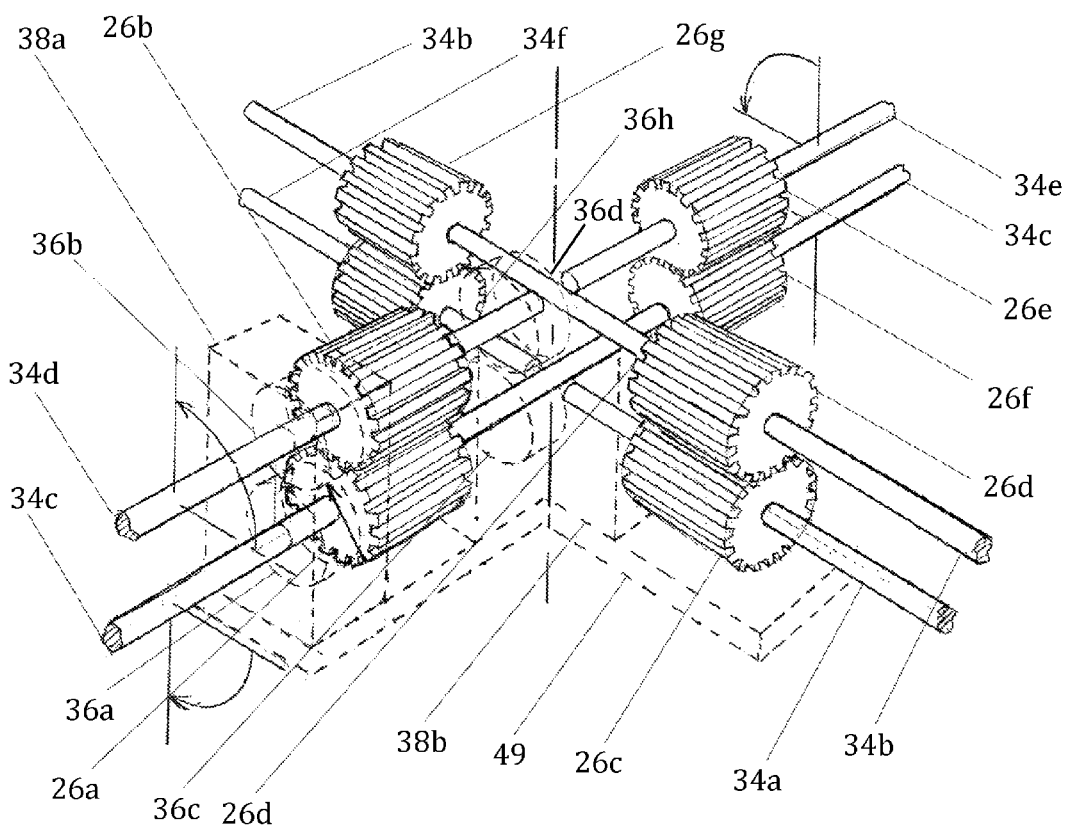
FIG. 8 shows a perspective with non-essential details removed.

FIG. 8 shows a perspective with non-essential details removed to show how the alignment of the blades mounted on plate 49 is accomplished. Shaft 34*b* is fixed to gears 26*d* and 26*g* to pass on transmitted power balancing the blades on shafts 34*a* and 34*f*. Shaft 34*a* is fixed to gear 26*c* and, shaft 34*f* is fixed to gear 36*h*. Shaft 34*c* is fixed to gears 26*a* and 26*f* and is allowed to pass between shafts 34*a* and 34*f* to bring shafts 34*a* and 34*f* into alignment with shaft 34*c*. Likewise, Shaft 34*c* is fixed to gears 26*a* and 26*f* to pass on transmitted power balancing the blades on shafts 34*d* and 34*e*. Shaft 34*d* is fixed to gear 26*b* and, 34*e* is fixed to gear 26*e*. Shaft 34*b* is fixed to gears 26*d* and 26*g* and is allowed to pass between shafts 34*d* and 34e to bring shafts 34d and 34e into alignment with shaft 34b. All shafts 34a, 34b, 34c, 34d, 34e and 34f are held in place in bearing housings 38a and 38b by bearings 36a, 36b, 36c and 36d (Note: bearings 36e, 36f, 36g, 36h, 36i, 36j, 36k, 36l, 36m, 36n, 36o and 36p are not shown) on either side of gears 36a, 36b, 36c, 36d, 36e, 36f, 36g, 36h, and allowed to turn freely.

FIG. 9 shows how angled blades in the lower diagram may be arranged compared to a straight blade configuration illustrated in the top diagram.

Figure 10:
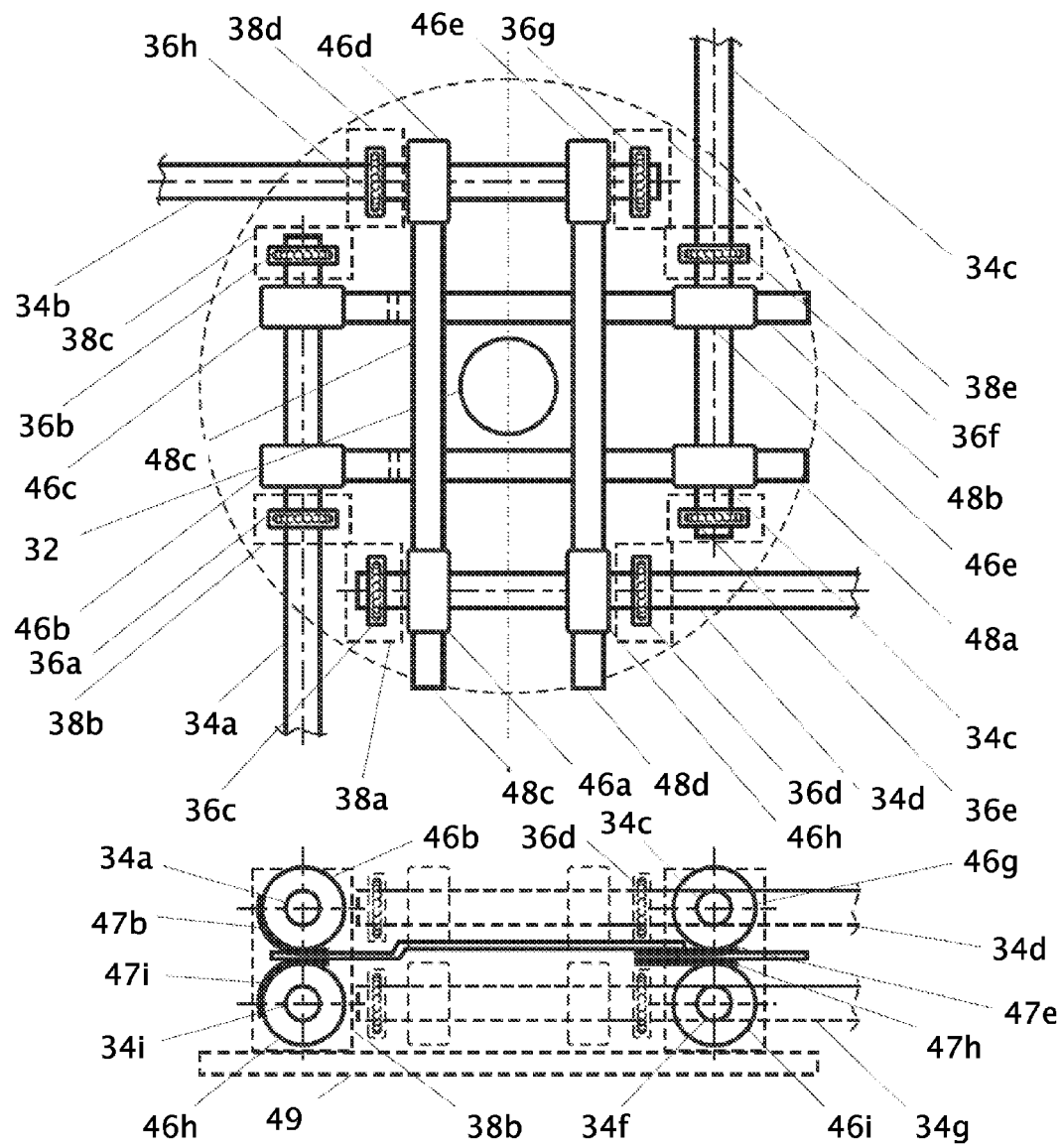
FIG. 10 shows the top and side view of an orthographic view of the hub of an angled blade mechanism.

FIG. 10 shows the top and side view of an orthographic view of the hub of an angled blade mechanism. The essential function of the turbine is the same where two blades (not shown) are arranged to counter balance each other on blade shafts 34a, 34b, 34c, 34d, 34e (not visible), 34f, 34g, 34h (not visible), and 34i. Each of the blade shafts pass through bearings 36a, 36b, 36c, 36d, 36e, 36f, 36g, and 36h, and are free to rotate ninety degrees (90°). The bearing are mounted in bearing holders 36a, 36b, 36c, 36d, 36e, 36f, 36g, and 36h, to a plate 49, that is attached to the drive shaft 32 to turn a generator (not shown). The semi-rigid belt, chain, cable or link system 47b is fixed at one end to roller or pulley 46b that is fixed so as to turn shaft 34a. The semi-rigid belt, chain, cable or link system 47i is fixed at one end to roller or pulley 46h is fixed so as to turn shaft 34i. Thereby, shafts 34a and 34i are also linked to turn ninety degrees (90°).in opposite directions to counter balance the blades (not shown). A transfer bar 48a transmits the action to belts, chain, cable or link system 47a and 47h, each fixed at one end to rollers or pulleys 46g and 46i respectively, turns shafts 34c and 34f respectively. Rollers or pulleys 46c, 46a (not visible) semi-rigid-belts, chains, cable or link system 47a and 47e (not visible) transfer bar 48b, belts 47f and 47g (not visible) rollers or pulleys 46e and 46f (not visible), are a duplicate set that also transfers the action from shafts 34a and 34i to shafts 34f and 34c, and are provided to balance the action and even the load on the bearings. The adjacent set of shafts 34d, 34g, 34b, 34h with rollers or pulleys 46d, 46a, 46e, 46h, semi-rigid belts, chains, cable or link system 47d 47e, 47f, 47g attached to transfer bars 48c and 48d are arranged the same way as the previously described set. The transfer bars 48a, 48b, 48c and 48d are bent in such a way as to be offset either up or down to accommodate each adjacent pair to pass either under or over without contact. This arrangement is thus allowing each pair of blade shafts and blades to remain on the same plane.

Figure 11:
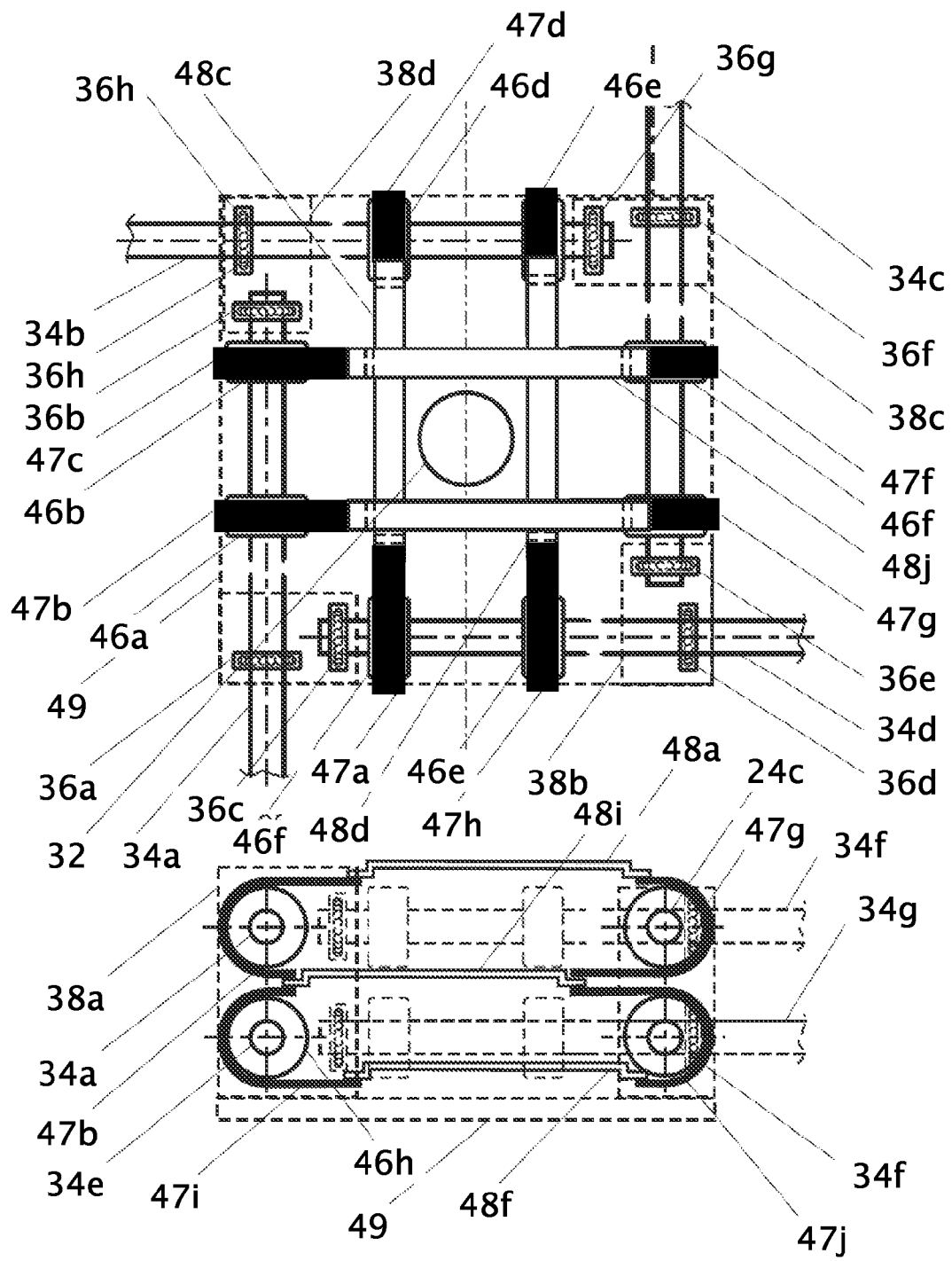
FIG. 11 shows the top and side of an orthographic view of the second preferred embodiment of the angled blade arrangement.

FIG. 11 shows the top and side of an orthographic view of the second preferred embodiment of the angled blade arrangement where the belts, chains, cable or link system 47b, 47i, 47g, 47j are attached to three transfer bars, 48a, 48i (not visible), and 48f (visible in FIG. 10), and for the same shafts 34a, 34e, 34c, and 34f, belts 47c, 47l (not visible), 47f and 47p (visible in FIG. 12) are attached to transfer bars 48j, 48h (visible in FIG. 12), 48b (visible in FIG. 10) to balance the mechanism and reduce wear on the bearings. Likewise, the adjacent set of belts, chains, cable or link system 47a, 47k, (visible in FIG. 12) and 47d are attached to transfer bars 48c, 48d (not visible) and 48g(not visible) and for the same shafts 34b, 34h, 34d and 34g, belts, chains, cable or link system 47n, 47e (visible in FIG. 10 and FIGS. 12), 47h and 47o (not visible) are attached to transfer bars 48e (visible in FIG. 12) , 48k (not visible) to maintain mechanical stability and reduce wear on the bearings.

Figure 12:
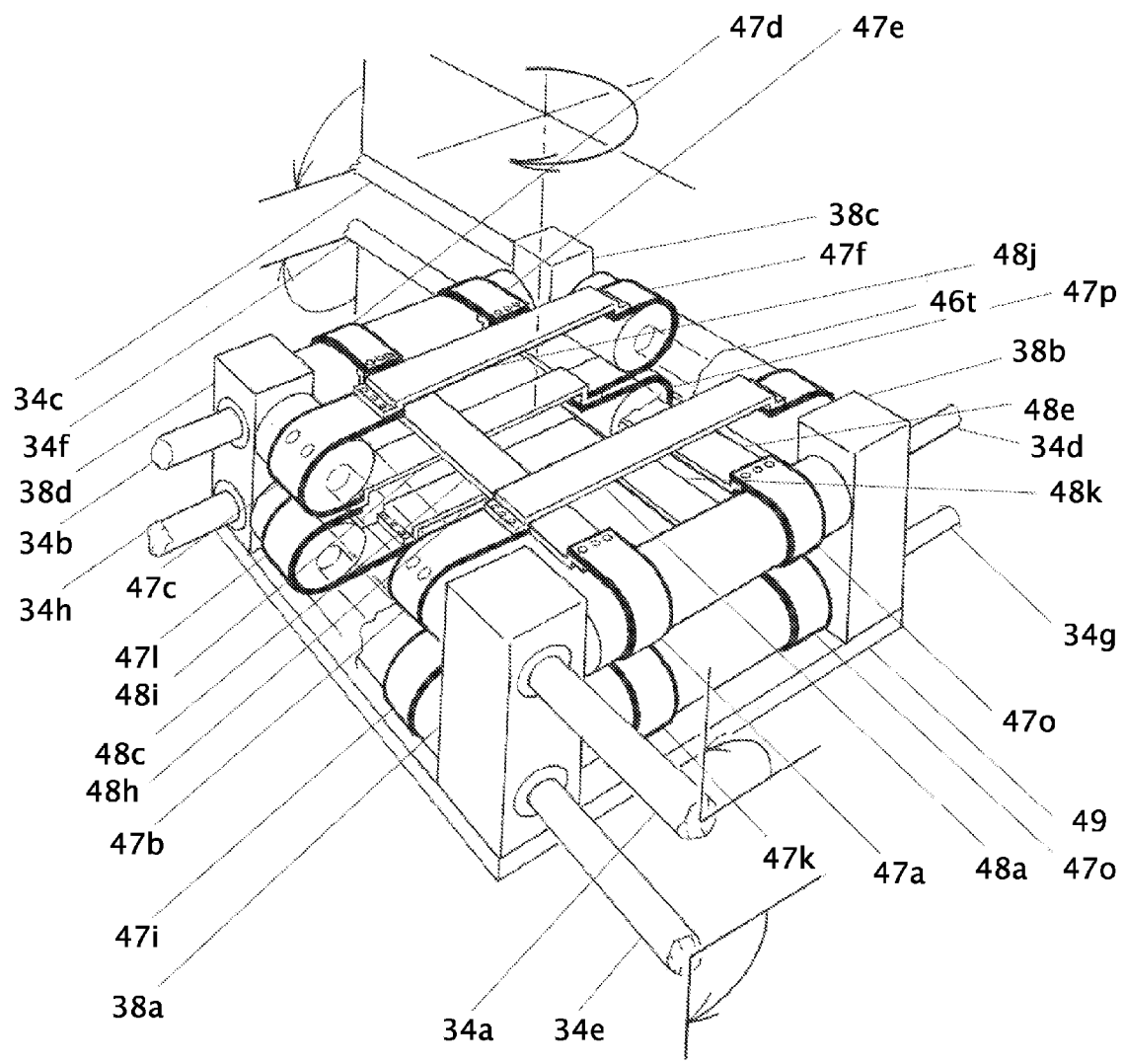
FIG. 12 shows a cut away view of the same second preferred embodiment of the angled blade arrangement from FIG. 11.

FIG. 12 shows a cut away view of the same second preferred embodiment of the angled blade arrangement where the belts, chains, cable or link system 47b, 47i, 47g, 47j are attached to three transfer bars, 48a, 48i (visible in FIG. 12), and 48f (visible in FIG. 11), and for the same shafts 34a, 34e, 34c, and 34f, belts, chains, cable or link system 47c, 47l (not visible), 47f and 47p are attached to transfer bars 48j, 48h, 48b to balance the mechanism and reduce wear on the bearings. Likewise, the adjacent set of belts, chains, cable or link system 47a, 47k,(visible in FIG. 12) and 47d are attached to transfer bars 48c, 48d (not visible) and 48g (not visible) and for the same shafts 34b, 34h, 34d and 34g, belts 47n, 47e (visible in FIG. 10 and FIGS. 12), 47h and 47o (visible in FIG. 12) are attached to transfer bars 48e, 48k (not visible) to maintain mechanical stability and reduce wear on the bearings.

Figure 13:
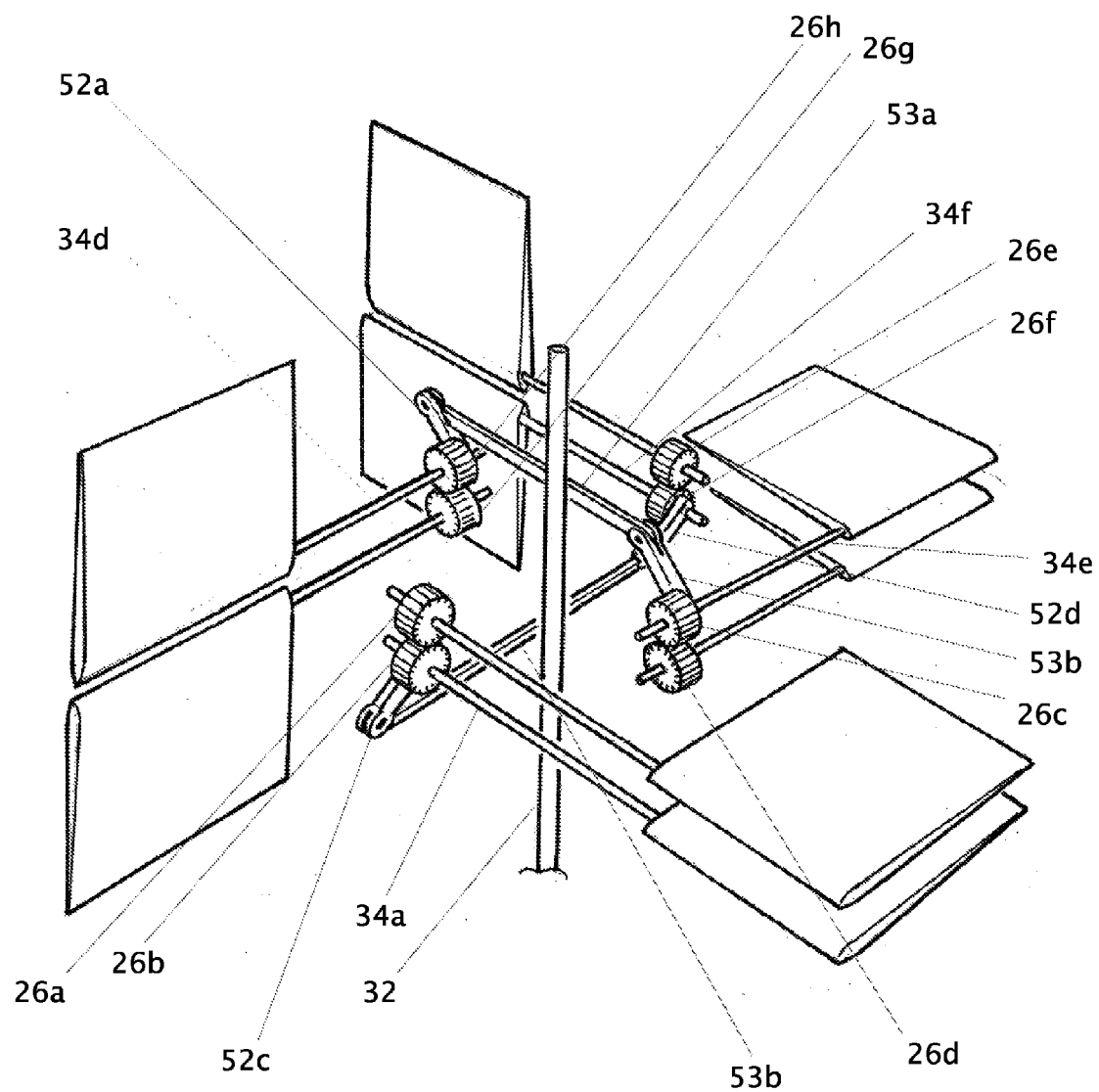
FIG. 13 shows a third preferred embodiment of the angled blade arrangement.

FIG. 13 shows a third preferred embodiment of the angled blade arrangement, with the mounting hardware removed for clarity, where the ninety degrees (90°) movements and balance of the blades is produced by gears 26a, 26b, 26c, 26d, 26e, 26f, 26g, and 26h, as previously described. Crank arm or lever 52a is fixed to blade shaft 34d, is hinged on rod 53a, which is hinged to another crank arm or lever 52b which in turn is fixed to blade shaft 34e, and thus transfers the blade action to the opposite paired set of blades. Likewise, crank arm or lever 52c is fixed to blade shaft 34a, is hinged on connector rod 53b which is hinged to another crank arm or lever 52d, which in turn is fixed on blade shaft 34f, and thus transfers the blade action to the opposite paired set of blades.

Figure 14:
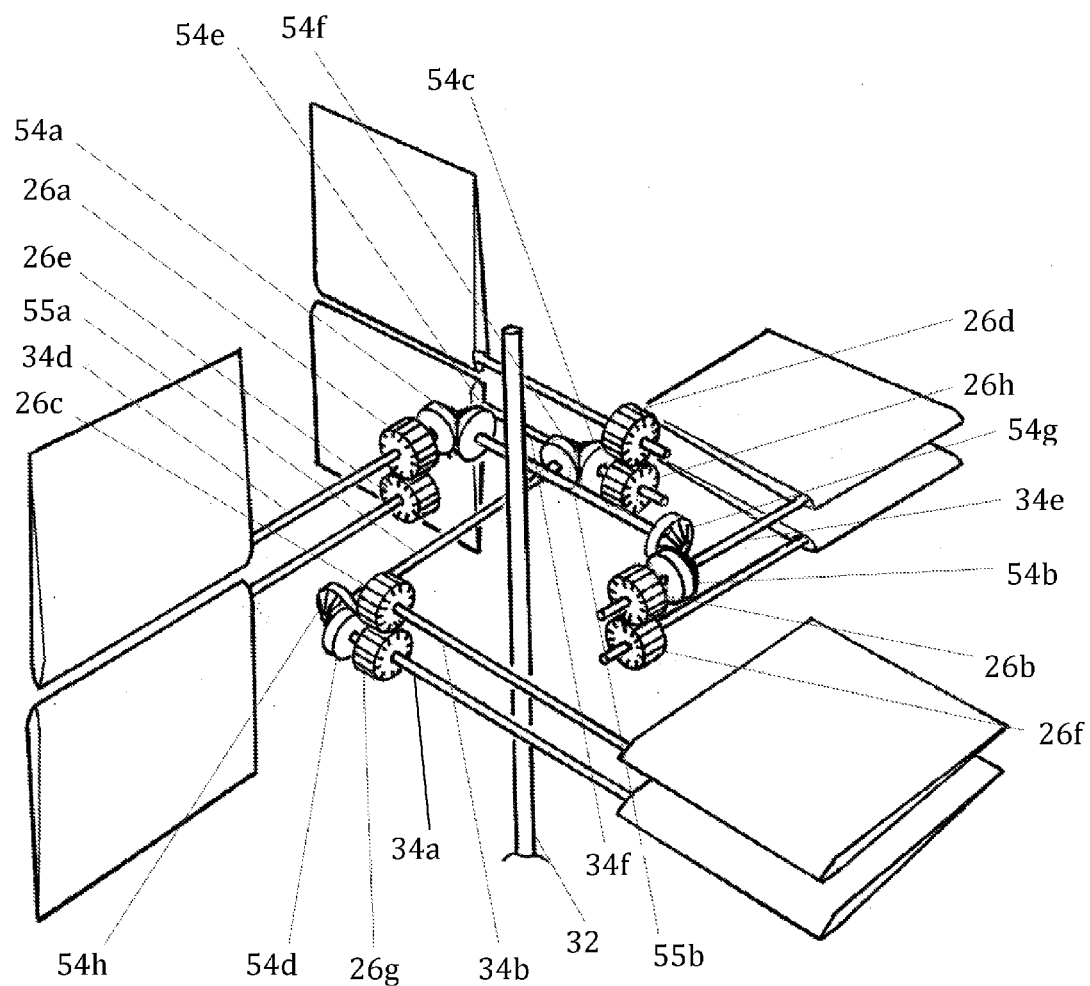
FIG. 14 shows a fourth preferred embodiment of the angled blade arrangement.

FIG. 14 shows a fourth preferred embodiment of the angled blade arrangement, with the mounting hardware removed for clarity, where the ninety degrees (90°) movements and balance of the blades is produced by gears 26a, 26b, 26c, 26d, 26e, 26f, 26g, and 26h, as previously described. Bezel, crown or 45° gear 54a is fixed to blade shaft 34d and is in contact so as to drive bezel, crown or 45° gear 54e attached to drive shaft 55b with bezel, crown or 45° gear 54g at the other end to drive bezel, crown or 45° gear 54g on blade shaft 34e, and thus transfers the blade action to the opposite paired set of blades. Likewise, Bezel, crown or 45° gear 54d is fixed to blade shaft 34a and is in contact so as to drive bezel, crown or 45° gear 54h attached to drive shaft 55a with bezel, crown or 45° gear 54f at the other end to drive bezel, crown or 45° 54c on blade shaft 34f, and thus transfers the blade action to the opposite paired set of blades.

Figure 15:
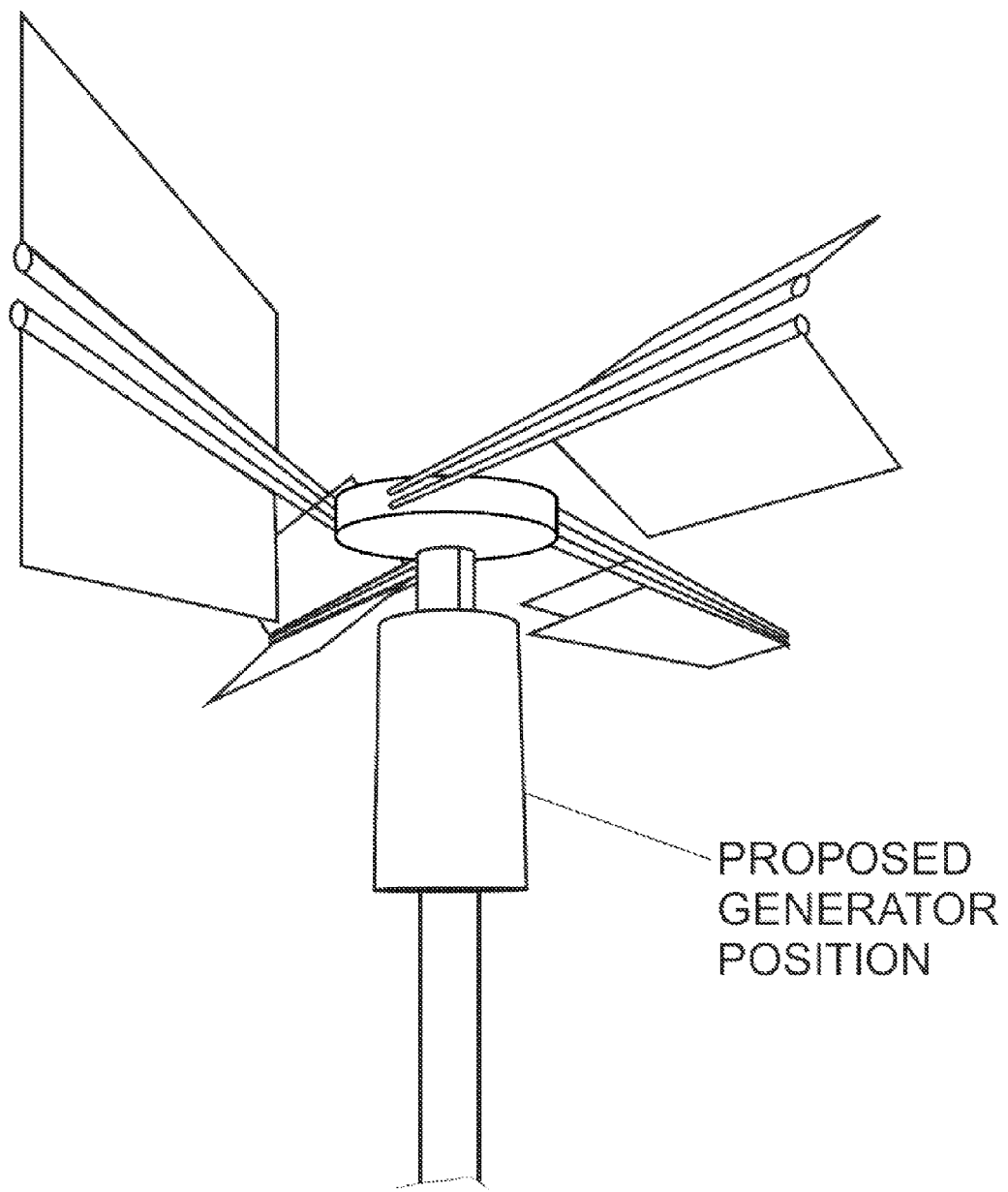
FIG. 15 shows a perspective view of the opposed tilting blade, vertical axis wind turbine power generator with the angle blade configuration.

FIG. 15 shows a perspective view of the opposed tilting blade, vertical axis wind turbine power generator with the angle blade configuration.

Operation

In operation a greater amount of energy can be obtained from the movement of air or liquid than previously designed wind mills, turbines, or other systems that obtaining energy from wind. The quarter circle rotation of the blades allows one blade set to gather wind energy in its vertical plane while on another end of the shaft the blade is horizontally aligned into the wind on its recovery to its wind opposing position, giving a small cross-section and thus less air resistance. The system is counterbalanced or counter-weighted to reduce loss of energy using a transmission like gears, levers, belts, chain, hydraulics, pneumatics, cable systems or weights. Six effects increase the energy effectiveness of this wind generator:

(1) the vertical access component of this windmill allows operation from wind coming from any direction in the horizontal plane parallel to the ground.

(2) less air resistance on the recovering blades (3) self actuating system, less energy loss (4) more than two sets of blades may be used and stacked giving a greater amount of torque energy to the generator as required (5) allows for any sudden variations in wind direction.

(6) a generator located at the bottom of the shaft gives less wind.

Thus, specific embodiments of a vertical-axis wind generator have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A vertical-axis wind generator, comprising:
    at least two pairs of horizontally rotating wind gathering blades having opposed ends said wind gathering blades on each end are oriented at a 90 degree rotation from each other;
    each pair of horizontal rotating wind gathering blades further has a complementary adjacent wind gathering blade wherein said set of complimentary wind gathering blades fold essentially flat together and 180 degrees opposed wherein;
    said folding is with a transmission that pivots vertically from a vertical driveshaft that links said complimentary blades together such that they operate in unison wherein;
    said transmission is with lever arms having a two-hinge assembly;
    said wind gathering blades are counter balanced;
    said wind gathering blades are counter-weighted; whereby
    (a) a wind drives said wind gathering blades around a drive shaft;
    (b) as each of said wind gathering blades comes into said wind, a respective one of said wind gathering blades is driven flat by said wind; whereby
    (c) tipping a corresponding one of said wind gathering blades opposing said respective one of said wind gathering blades on a wind gathering side to a vertical orientation to harness energy from said wind, and
    (d) said vertical-axis wind generator is weight balanced to reduce energy loss.

2. The vertical-axis wind generator according to claim 1 wherein said transmission is with hydraulics, pneumatics.

3. The vertical-axis wind generator according to claim 1 wherein said transmission is with chain, belts or cables.

4. The vertical-axis wind generator according to claim 1 wherein each of said wind gathering blades is wind foil shaped.

5. The vertical-axis wind generator according to claim 1 that further includes a power generator that is driven from said vertical axis.

6. The vertical-axis wind generator according to claim 5 wherein said power generator is located below said blades or in a base of said vertical-axis wind generator.

7. The vertical-axis wind generator according to claim 1 wherein there are four pairs of horizontally rotating wind gathering blades.

8. The vertical-axis wind generator according to claim 1 wherein each of said pairs of horizontally rotating wind gathering blades operate independently.

9. The vertical-axis wind generator according to claim 1 wherein said blades are angled from a vertical axis about which said vertical-axis wind generator rotates.

10. The vertical-axis wind generator according to claim 1 wherein said blades are offset from a vertical axis about which said vertical-axis wind generator rotates.

11. The vertical-axis wind generator according to claim 1 wherein said wind gathering blades are vertically offset a vertical axis about which said vertical-axis wind generator rotates.

12. The vertical-axis wind generator according to claim 1 wherein said wind gathering blades exist in a plane that is perpendicular to a vertical axis about which said vertical-axis wind generator rotates.

* * * * *